United States Patent [19]

Klee et al.

[11] 4,372,130
[45] Feb. 8, 1983

[54] CARBON DIOXIDE SNOW GENERATOR WITH PURGING MEANS

[75] Inventors: David J. Klee, Emmaus; Norris G. Lovette, Jr., Breinigsville; David R. Ruprecht, Laurys Station; John F. Boyle, Emmaus; John C. Mullane, Jr., Allentown, all of Pa.

[73] Assignee: Air Products and Chemicals, Inc., Allentown, Pa.

[21] Appl. No.: 303,279

[22] Filed: Sep. 17, 1981

[51] Int. Cl.³ .............................................. F25D 13/00
[52] U.S. Cl. ........................................ 62/330; 62/35; 62/384
[58] Field of Search ................... 62/76, 330, 384, 10, 62/35, 303

[56] References Cited

U.S. PATENT DOCUMENTS

| 3,757,367 | 9/1973 | Campbell | 62/10 |
| 3,807,187 | 4/1974 | Vorel | 62/76 |
| 3,815,377 | 6/1974 | Tyree, Jr. | 62/384 |
| 4,111,671 | 9/1978 | Wiliamson | 62/10 |
| 4,166,364 | 9/1979 | Ruprecht | 62/384 |

Primary Examiner—Ronald C. Capossela
Attorney, Agent, or Firm—Geoffrey L. Chase; E. Eugene Innis; James C. Simmons

[57] ABSTRACT

A carbon dioxide snow generator is disclosed which has a purge conduit for controllably delivering a blast of pressurized fluid at the inner surfaces of the generator to dislodge and remove any residual or clogging deposits of carbon dioxide snow. A vapor loop for such a generator is also disclosed which provides an initial blast of relatively warm carbon dioxide gas at startup which gas entrains and removes any residual liquid before it can freeze in the apparatus.

9 Claims, 6 Drawing Figures

CO₂ SNOW
MIXED WITH PRODUCT

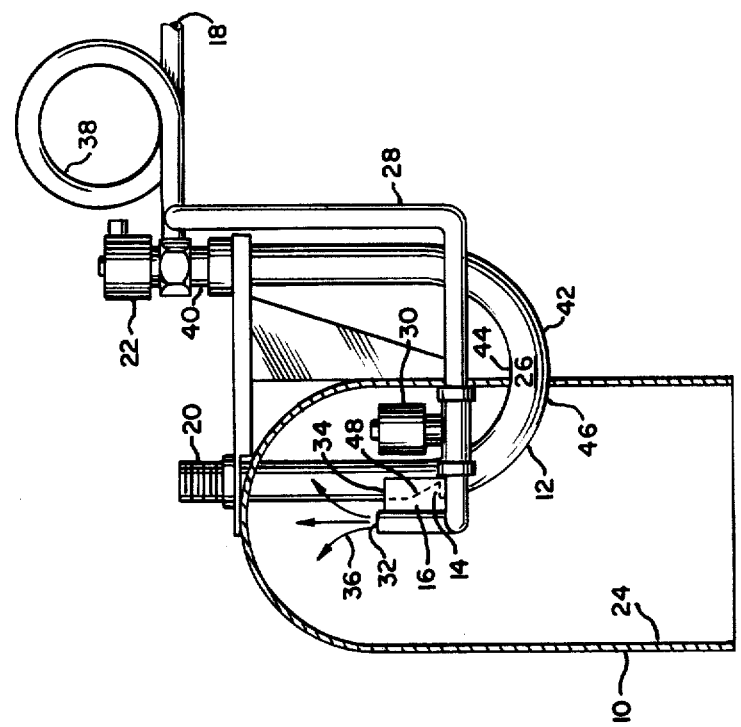
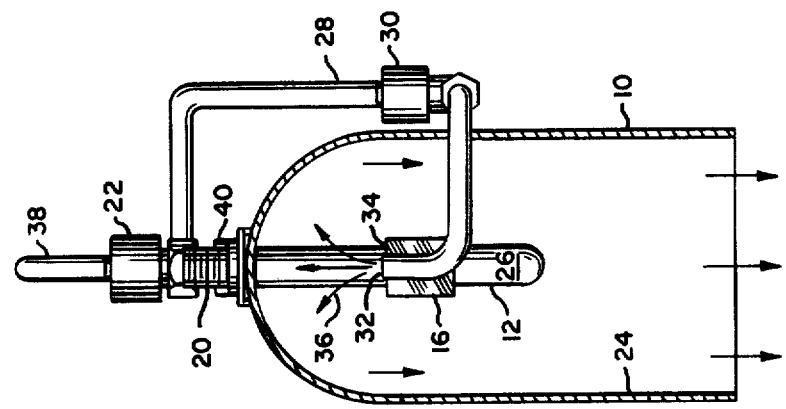
FIG. 3
FIG. 2

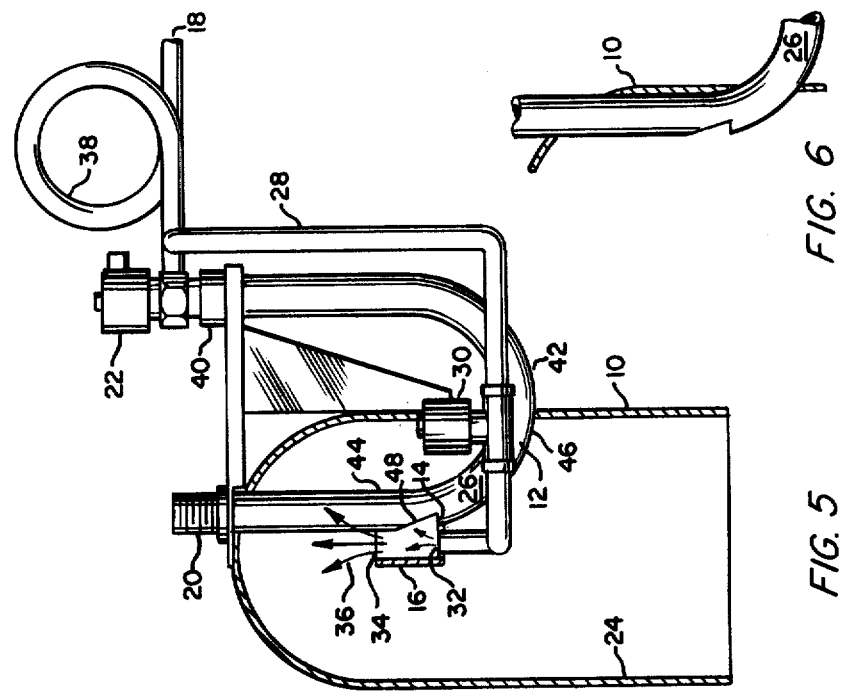
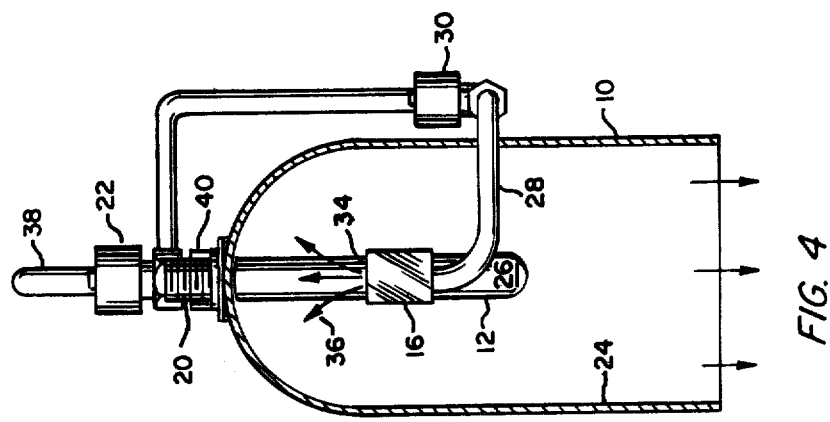
FIG. 6
FIG. 5
FIG. 4

CARBON DIOXIDE SNOW GENERATOR WITH PURGING MEANS

TECHNICAL FIELD

The present invention is directed to the field of carbon dioxide snow generators for use in various commercial enterprises such as food packaging or heat sensitive material containment. Carbon dioxide snow refers to small particulate or flake structures of solid carbon dioxide in contrast with larger forms such as pellets or chips of solid carbon dioxide. Solid carbon dioxide is generally referred to as dry ice. Carbon dioxide snow is generally formed by the reduction in pressure of a stream of liquid carbon dioxide. This pressure reduction or flashing creates a two-phase mixture of carbon dioxide gas and carbon dioxide solid particles. This phenomena occurs when liquid phase carbon dioxide is reduced in pressure below its triple point to a physical state wherein only the gaseous and solid phases of carbon dioxide exist.

BACKGROUND OF THE PRIOR ART

Various apparatus have been described in the prior art for the generation of carbon dioxide snow. For example, in U.S. Pat. No. 3,757,367, the patentee discloses a J-shaped conduit through which liquid carbon dioxide is passed and in which the pressure on the liquid carbon dioxide is reduced so as to provide carbon dioxide snow entrained in a carbon dioxide vapor flow. The patent uses a circular flow path in order to separate the snow by centrifugal force from the vapor. An electrically warmed discharge port is provided along the curved portion of the J-tube so that the solid carbon dioxide in the form of snow is removed and downwardly discharged from the apparatus. This apparatus provides a narrow concentrated discharge pattern of carbon dioxide snow. A heating element is utilized or proposed because of problems with the clogging of the discharge port of this carbon dioxide snow generator.

In another example of the prior art, U.S. Pat. No. 3,807,187 discloses the utilization of a J-tube as well as a direct discharge snow horn for the production and delivery of carbon dioxide snow. This patent recognizes the problems inherent in apparatus for the production of carbon dioxide snow, namely the build-up of undesirable levels of carbon dioxide gas in the environment surrounding the snow generation operation. For the safety of operating personnel, such build-ups of carbon dioxide gas must be vented. The patent suggests the powered removal of carbon dioxide vapors. This teaching also discloses a small discharge outlet which redirects the carbon dioxide snow from a J-tube.

In U.S. Pat. No. 4,111,671 the patentee teaches the use of a rectangular cross-sectioned J-tube in which the cross-section is of increasing area as one leaves from the liquid input end of such tube. The cross-sectional change is made to reduce the pressure to allegedly provide greater separation of the solid and vapor phases.

U.S. Pat. No. 4,166,364, assigned to the same assignee as the present invention, discloses a carbon-dioxide snow hood which incorporates a J-tube and a diffuser chamber which chamber reverses the flow of carbon dioxide snow, while at the same time diffusing the stream of snow into a wide low velocity pattern. Again, this patent does not address the purging of residual materials within the snow generating apparatus.

The prior art fails to provide any means for automatic cleaning or purging of carbon dioxide snow generating apparatus. The clogging or deposition of dry or water ice on various operating surfaces of carbon dioxide snow generating apparatus is known to occur. Such clogging and deposition can provide operational as well as sanitary problems for such snow generation.

Therefore, it is an object of the present invention to provide means for the automatic purging of carbon dioxide snow from various surfaces of the snow generating apparatus.

It is also an object of the present invention to provide means for exhausting entrained water from the apparatus prior to snow generation and the potential formation of water ice.

It is another object of the present invention to provide snow generation apparatus in which the surfaces have a reduced tendency to retain carbon dioxide snow or water ice.

It is yet another object of the present invention to provide means for achieving the above objects in an automatic operation of purging apparatus included in the carbon dioxide snow generating apparatus of the present invention.

BRIEF SUMMARY OF THE INVENTION

The present invention comprises an improved carbon dioxide snow generator which includes a reversing diffuser chamber in which a J-tube carbon dioxide snow separator is affixed such that an outlet for the particulate or flaked carbon dioxide snow directs said snow against the diffuser chambers inner surface in order to reverse and diffuse the snow for a reduced velocity flow pattern of the snow outward of the diffuser chamber, the improvement comprising a separate purge conduit for pressurized fluid feed which is controlled by appropriate valving so as to provide a momentary burst of purging pressurized fluid at the inside surfaces of the diffuser chamber and preferably at the outlet of the J-tube.

Additionally, the present invention comprises such an above-recited snow generator in which a vapor loop is formed in the liquid carbon dioxide feed line to the J-tube separator such that a residual, relatively warm portion of gaseous carbon dioxide resides in the vapor loop as a vapor trap to the liquid carbon dioxide feed flow. During initial start-up of the generator, the gaseous carbon dioxide purges the down stream portion of the J-tube separator of any liquid phase components which may freeze and clog the apparatus during snow generation.

Optionally, the present invention also provides a Teflon coating on the inside surfaces of the diffuser chamber as well as on the outside surfaces of the J-tube separator where the components of the J-tube separator reside inside the diffuser chamber.

Alternately, the present invention comprises such a snow generator as discussed above wherein the exhaust end of the J-tube is juxtapositioned to the inside surface of the diffuser chamber to eliminate a horizontal surface onto which carbon dioxide snow might accumulate.

BRIEF DESCRIPTION OF THE DRAWING

FIG. 2 is a front elevational view in cross-section of the first embodiment of the snow generator and purge system of the present invention.

FIG. 3 is a side elevational view in cross-section of a first embodiment of the snow generator and purge system of the present invention.

FIG. 4 is a front elevational view in cross-section of a second embodiment of the snow generator and purge system of the present invention.

FIG. 5 is a side elevational view in cross-section of the second embodiment of the snow generator and purge system of the present invention.

FIG. 6 is a partial side elevational view in cross-section of an alternate embodiment of the snow generator and purge system of the present invention.

DETAILED DESCRIPTION OF THE INVENTION

Figure 1:
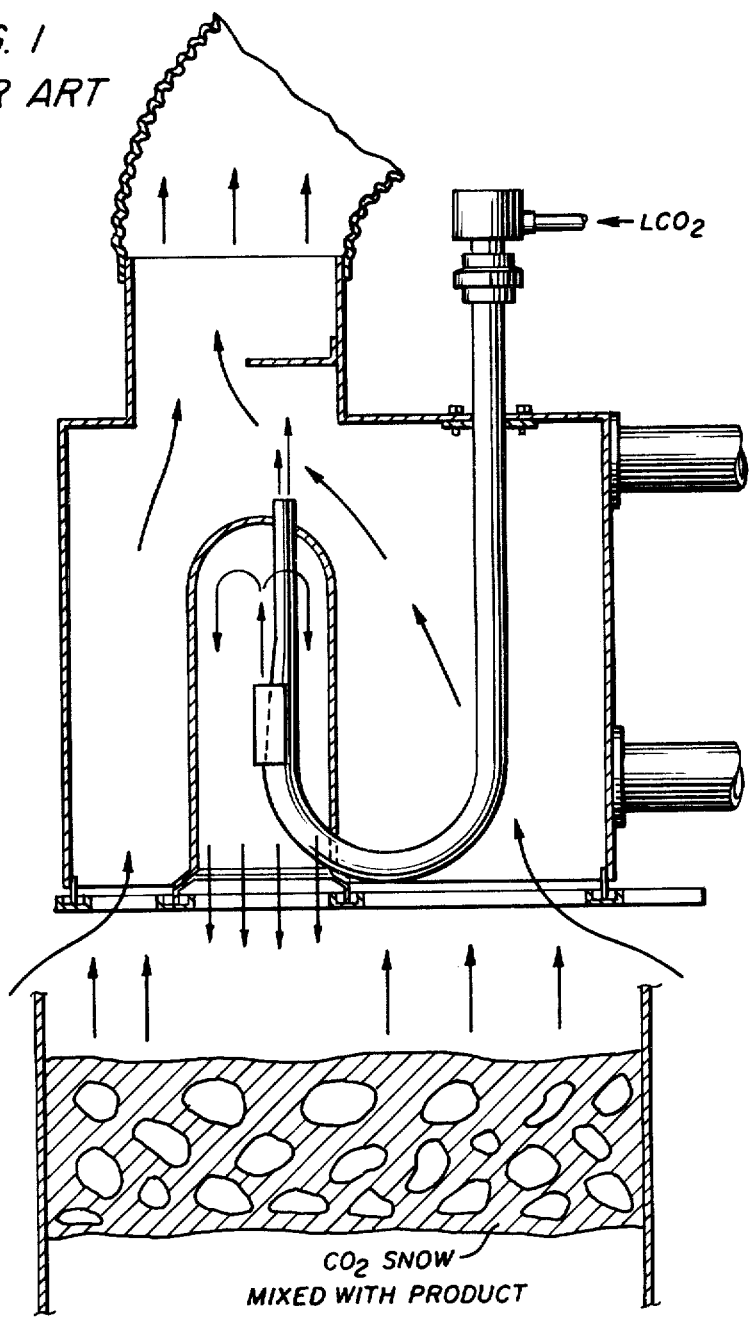
FIG. 1 is a side elevational view in cross-section showing a snow generator mounted in an exhausting hood and positioned over product to be cooled. This figure represents the prior art.

With reference to FIG. 1, the prior art snow hood and snow generator using a diffuser chamber in cooperation with a J-tube separator demonstrates the prior art most relevant to the present invention. The environment in which the present invention would be utilized is also apparent from FIG. 1 of the prior art. This prior art snow generator and hood is the subject of U.S. Pat. No. 4,166,364, the text of which is incorporated herein by reference. Carbon dioxide snow generating equipment is usually used within a hood arrangement which removes gaseous carbon dioxide from the area where an operations personnel may be located. Such carbon dioxide snow generating equipment is usually suspended over a conveyor belt or container of product to be chilled by the descending carbon dioxide snow. Exemplary of products to be contacted with carbon dioxide snow are food products and sensitive chemicals such as catalysts or polymer starting materials. Because of problems with clogging of snow and water ice in apparatus such as the prior art in FIG. 1, the present invention was conceived and developed to overcome such problems.

With reference to FIG. 2 and FIG. 3, the purge system of the present invention is viewed in its first embodiment. The carbon dioxide snow generator consists of a reversing diffuser chamber 10 into which a J-tube snow separator 12 is positioned. The J-tube snow separator is fed by a liquid carbon dioxide inlet 18 affixed to the end of the J-tube which resides outside the diffuser chamber 10. Supply of the liquid carbon dioxide from the inlet 18 to the J-tube 12 is controlled by a separator solenoid valve 22. When the valve is in the open position, high pressure liquid carbon dioxide passes from the inlet 18 into the J-tube snow separator 12 and is expanded through an expansion orifice 40 which is not shown in detail in the figures. As is recited by the prior art, the expansion of liquid carbon dioxide to a pressure below its triple point, creates a two-phase mixture of solid carbon dioxide and gaseous carbon dioxide. This two-phase mixture of solid and gaseous carbon dioxide is accelerated through the curved pathway 42 of the separator 12 due to the pressure differential therein. As the solid and gaseous carbon dioxide flow through the curved portion of the separator 12, the solid carbon dioxide snow is forced by its greater weight against the radial outer section 46 of the tube, while the gaseous carbon dioxide remains in the inner radial section 44 of the tube. Therefore, when the two-phase carbon dioxide stream reaches the down-stream end of the curved portion of the separator 12, the snow may be removed from the flow path by a slot 14 formed as a carbon dioxide snow outlet in the tube of the separator. The slot 14 preferably has a deflection plate 48 incorporated in said slot in order to provide a good separation surface for the snow leaving the path of the carbon dioxide gas. Alternately, the separator tube downstream of the slot 14 could be of reduced diameter in order to provide the separation and outward flow of the carbon dioxide snow from the residual carbon dioxide gas. As the carbon dioxide snow leaves the slot 14 of the separator 12, it is directed at high velocity against the inside surface 24 of the diffuser chamber 10 with the assistance of the snow shield 16. Upon impact of the snow against the chamber walls, the snow is directed outward and downward of the chamber in a diffused and slow flow path.

At times, it is found that carbon dioxide snow clings to and clogs the surfaces and apparatus within the reversing diffuser chamber 10. In order to eliminate this deposited carbon dioxide solids, a purge system has been incorporated into the carbon dioxide snow generator of the present invention. As shown in FIG. 2 and FIG. 3 a separate purge line 28 is connected into the liquid carbon dioxide inlet 18 of a snow generator upstream of the separator solenoid valve 22. This purge line 28 is controlled by a purge solenoid valve 30. The purge line 28 is positioned so as to pass through the side wall of the diffuser chamber 10 and curve inward and upwardly so as to discharge in the same direction as the carbon dioxide snow, namely to the closed end of the diffuser chamber 10. In this first embodiment as shown in FIG. 2 and FIG. 3, the purge line discharges pressurized carbon dioxide through a purge line orifice 32 immediately next to the outlet of the J-tube carbon dioxide snow separator 12. The purge solenoid valve 30 may be controlled to open at any time during the operation of the snow generator, but preferably, the solenoid valve 30 will be set to provide a pressurized carbon dioxide purge blast at the termination of a snow generation cycle. In this manner, any carbon dioxide snow which has adhered to the inner surface of the diffuser chamber 10 or the apparatus contained therein will be purged and removed by the blast of the carbon dioxide in the purge line 28. A typical cycle time is 4 seconds snowing time followed by 0.3 seconds purging time. A longer purge blast time could disturb the layered snow in the container being processed. The blast of pressurized carbon dioxide leaves the purge line orifice at high speed based upon an optimal pressure in the purge line of 250 to 300 psi. However, other pressure levels are deemed to be operable and within the contemplation of this invention as long as a cleansing blast of pressurized carbon dioxide is delivered from the purge line.

Although a purge of carbon dioxide has been described and shown in the drawings because of its ready availability from the carbon dioxide snow source 18, it is within the contemplation of the invention to provide a purging fluid blast from other pressurized fluid sources, such as a nitrogen tank or an air compressor. In that event, purge line 28 would be connected directly to such other pressurized fluid source rather than line 18 in order to provide a purge blast of such other pressurized fluid as nitrogen, air or other safe pressurized fluids.

In addition to the formation of carbon dioxide snow deposits on the inner surface of the diffuser chamber 10, residual snow can also build up in the slot 14 of the separator tube 12. To remedy this specific problem, the second embodiment of the present invention as shown in FIG. 4 and FIG. 5 was designed. In this second embodiment, which is the preferred embodiment, the purge line orifice is directed into the area of the output of the J-tube separator. Effectively, the purge line discharges into the same snow shield 16 which is used by the J-tube separator to insure direction of the carbon dioxide snow toward the closed end of the diffuser chamber. In this manner, the carbon dioxide purge blast is directed not only to the diffuser chamber inside surface 24, but also to the area of the J-tube separator outlet or slot 14. The slot 14 and the deflection plate 48 are thereby cleansed of any residual solid carbon dioxide.

During clean-up of the snow generating apparatus or because of ambient atmosphere conditions, the generator at times is contaminated with liquid water. When the liquid water is trapped within the curved portion of the J-tube separator 12 then conditions exist under which the liquid water may freeze during start-up of the carbon dioxide snow generation. Such water ice formation could clog the generating apparatus in much the same way as the deposition of carbon dioxide snow on the equipment. The present invention avoids such drawback as experienced in the prior art by the incorporation of a vapor loop 38 in the liquid carbon dioxide inlet 18 of the snow generating equipment. This vapor loop 38 retains a gaseous portion of carbon dioxide after shut down of the snow generating equipment. The carbon dioxide in the vapor loop 38 is warmed by ambient conditions to a point where the carbon dioxide remains only in the gas phase. The loop effects a vapor trap for the liquid carbon dioxide in much the same way that a downward loop in a liquid flow line provides a liquid trap. When the snow generating equipment is started up, the initial flow through both the J-tube separator and the purge line consists of relatively warm carbon dioxide vapor. This relatively warm carbon dioxide vapor acts as a purge stream to rid the downstream equipment of any residual liquids and water prior to such water being frozen by the discharge of liquid carbon dioxide.

As the proceeding discussion points out, the present invention provides a snow generating apparatus with means to clean residual solid formations from the apparatus for maximum output and use. Although the prior art has not solved the problem of carbon dioxide and water ice formation within the pertinent generating equipment, the present invention provides two means for the removal of such potentially performance diminishing depositions. To facilitate the operation of both of these purging features of the present invention, it is also contemplated that the inner surface of the diffusion chamber 24 and the exterior of the generating equipment positioned within the chamber such as the exterior surface of the J-tube 26 will be coated with a nonadhering surface coat such as Teflon. Such a nonadhering coating works in conjunction with the vapor loop 38 and the purge line 28 to insure that smooth and complete operation of the snow generating equipment occurs without the buildup of carbon dioxide snow or water ice in the pathways of the carbon dioxide flow.

In FIG. 6, the present invention is shown in a partial fragmented view of a different alignment of the J-tube 26 within the diffuser chamber 10. The discharge or exhaust end of the J-tube is juxtaposition against the inner surface of the diffuser chamber 24 in order to eliminate horizontal or near-horizontal surfaces within the chamber. This alternate embodiment which can be used with either the first embodiment or the second embodiment diminishes the area within the diffuser chamber where carbon dioxide snow might accumulate, and has utility in mainly non-food applications.

The present invention has been described with respect to two specific embodiments of that invention, but it is deemed that the invention should not be limited by such specific disclosures, but should be delineated by the claims which are set forth below.

What is claimed is:

1. In an apparatus for depositing carbon dioxide snow on a product comprising: a reversing diffuser chamber having side walls, a closed upper end, and an open bottom; means for separating a two-phase flow of gaseous and solid carbon dioxide into separable high velocity streams of gaseous and solid carbon dioxide; and means for directing said high velocity stream of solid carbon dioxide upwardly into said reversing diffuser chamber whereby said stream is reversed, diffused and reduced in velocity to form a dispersed, downwardly flowing, low velocity stream of carbon dioxide snow, the improvement comprising a purge means which can controllably direct a high speed blast of a purge stream of pressurized fluid, at the inside surface of the reversing diffuser chamber to remove any residual carbon dioxide snow on said surfaces.

2. In a snow hood for depositing carbon dioxide snow on a product comprising: an exhaust housing having an open bottom; a reversing diffuser chamber within said exhaust housing having side walls, a closed upper end, and an open bottom; means for separating a two-phase flow of gaseous and solid carbon dioxide into separate high velocity streams of gaseous and solid carbon dioxide; and means for directing said high velocity stream of solid carbon dioxide upwardly into said reversing diffuser chamber whereby said stream is reversed, diffused and reduced in velocity to form a dispersed, downwardly flowing, low velocity stream of carbon dioxide snow, the improvement comprising a purge means which can controllably direct high speed blast of a purge stream of pressurized fluid at the inside surface of the reversing diffuser chamber to remove any residual carbon dioxide snow on said surfaces.

3. The invention of claim 2 wherein the purge means has an orifice directly adjacent the slot in the snow separator means, where solid carbon dioxide leaves said separator, such that the purge stream emanating from said purge orifice removes any residual carbon dioxide snow from said slot as well as from the inside surface of said chamber.

4. The invention of claim 3 wherein said pressurized fluid is carbon dioxide.

5. The invention of claim 1 wherein the purge means has an orifice directly adjacent the slot in the snow separator means, where solid carbon dioxide leaves said separator, such that the purge stream emanating from said purge orifice removes any residual carbon dioxide snow from said slot as well as from the inside surface of said chamber.

6. The invention of claim 5 wherein said pressurized fluid is carbon dioxide.

7. The invention of claim 1, 2, 3, 4, 5 or 6 including a liquid carbon dioxide feed line having a vaper loop therein upstream of said separator such that a gaseous trap of relatively warm carbon dioxide is retained in said loop and is the initial charge to be discharged during startup of the separator such that residual liquid is removed from the separator before it can freeze as a solid deposition.

8. The invention of claim 1, 2, 3, 4, 5 or 6 wherein the inside surface of the diffuser chamber and the exposed portions of the separator means in said chamber are coated with Teflon.

9. The invention of claim 1, 2, 3, 4, 5 or 6 wherein the J-tube of the generator is positioned within the diffuser chamber such that the discharge end of the J-tube is juxtapositioned to the inside surface of said chamber.

* * * * *